June 2, 1931.  E. W. DAVIS  1,807,899
LUBRICATING APPARATUS
Filed Nov. 11, 1927
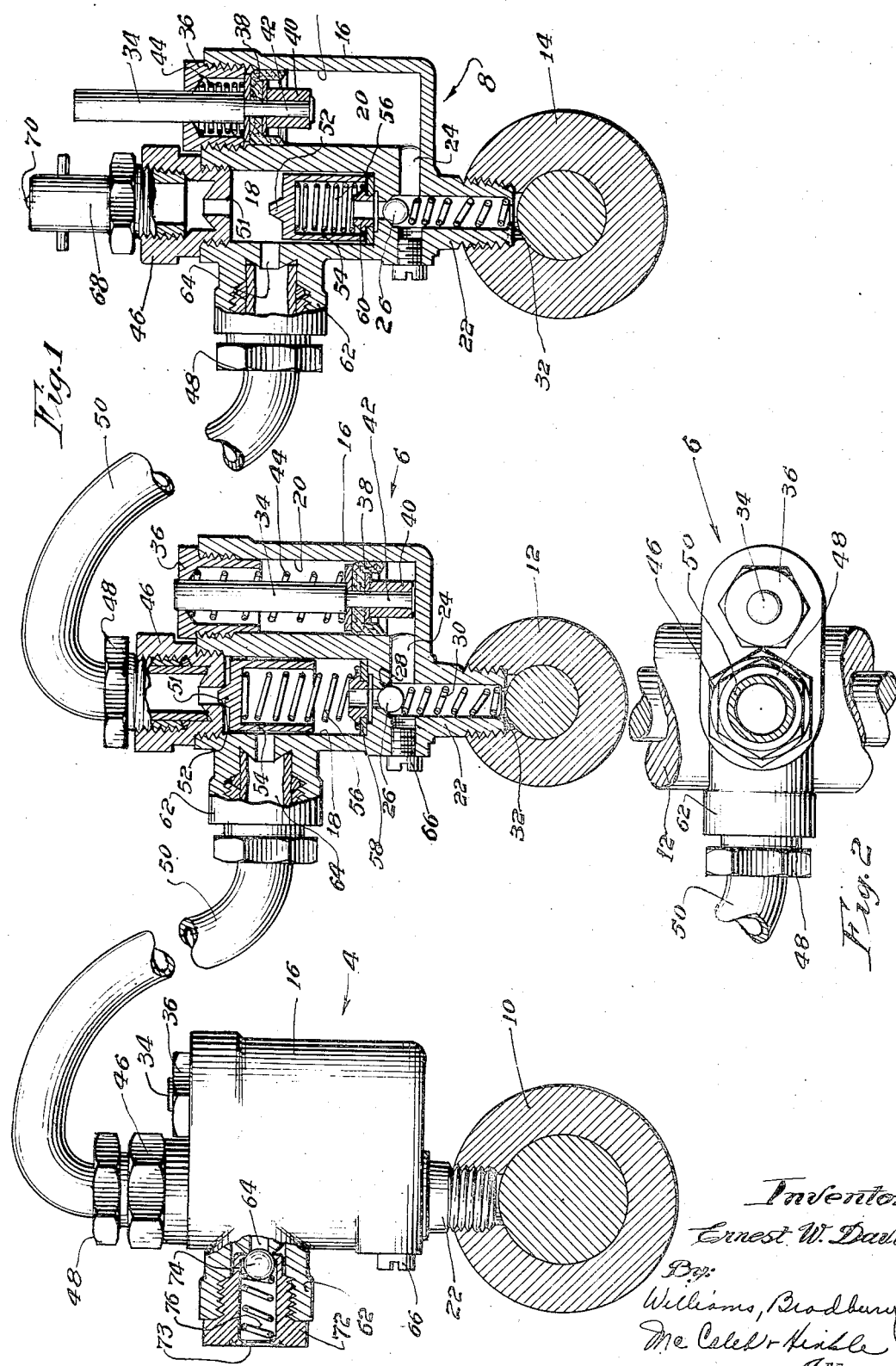
Inventor:
Ernest W. Davis
By
Williams, Bradbury,
McCaleb & Hinkle
Attorneys Patented June 2, 1931

1,807,899

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING APPARATUS

Application filed November 11, 1927. Serial No. 232,550.

My invention relates generally to lubricating apparatus, and more particularly to improvements in lubricating systems in which a plurality of bearings are lubricated from a single source, and in which each of a series of bearings has a measuring device adjacent thereto which is capable of discharging a measured quantity of lubricant to the bearing with which it is associated and then opening a port leading to the next device of the series so that the bearings will be lubricated progressively.

It is an object of my invention to provide an improved measuring device in which means are provided for storing the charge of lubricant so that the operation of the measuring valve will not be hampered by the high resistance to flow encountered in some bearings.

A further object is to provide a measuring device equipped with means whereby lubricant may be forced into a bearing at a higher pressure than the pressure at the source, so that clogged bearings may be flushed out under high pressures.

Other objects will appear from the following description, reference being had to the accompanying drawings, in which Figure 1 shows a plurality of my improved measuring devices connected in series, two of these devices being shown in section with the operative parts in different positions, and Figure 2 is a plan view of one of the measuring devices.

For purposes of illustration I have shown three measuring devices, 4, 6 and 8, attached to bearings 10, 12 and 14, respectively, these devices and bearings being illustrative of the system which in practice may be applied to machines having practically any number of bearings; for example, the system may be used in lubricating all of the bearings of a punch press, ore crusher, lathe, rolling mill, or similar machine.

As shown in Figure 1, each of the measuring devices comprises a body 16 having two vertical cylinders 18 and 20 formed therein. A boss 22 in axial alignment with the cylinder 18 is externally threaded and adapted to be screwed into the bearing to be lubricated. This boss is axially bored and is in direct communication with the lower end of the cylinder 20 through a drilled passage 24. Communication between the cylinder 18 and the bearing is controlled by a ball valve 26 which is held against its seat 28 by a spring 30, the lower end of which rests upon a small flange 32 turned inwardly at the end of the boss 22. A plunger 34 has its upper end guided in a bushing 36 which is threaded into the upper end of cylinder 20. The plunger carries a cup leather 38 which is held between the usual back and face plates by a spacing sleeve 40. The reduced end portion 42 of the plunger passes through the back plate, cup leather, the face plate and the sleeve 40, and has its end riveted over to secure these parts permanently together. A spring 44 normally forces the plunger downwardly until its lower end contacts with the end wall of the cylinder 20, the spring being confined between the back plate and the bushing 36.

A bushing 46 is threaded in the upper end of cylinder 18 and is internally threaded to receive a packing nut 48 by which a conduit 50 may be attached. The lower end of the bushing 46 has a small axially drilled hole forming a passage for the lubricant, the lower edge of the bushing around this opening forming a seat 51 for a frusto-conical projection 52 formed at the center of the top of a piston valve 54 which is freely reciprocable within the cylinder 18. One end of a spring 56 abuts against the inside end wall of the valve 54 and the other end rests upon a perforated gasket 58 which is positioned at the lower end of the cylinder 18. A shouldered ring 60 fits within the perforation of the gasket 58 and projects upwardly therefrom to center the lower end of the spring 56 within the cylinder 18.

The body 16 has a lateral boss 62 having an outlet port 64 formed therein. Suitable means are provided for connecting the conduit 50 at this boss. During the drilling of the passage 24 a hole is formed in the body 16 which is plugged by a cap screw 66.

The first measuring device 8 of the series (here shown as attached to bearing 14) is provided with a pin fitting 68 which is of well known construction and is adapted for quick connection with a high pressure lubricant compressor and has a spring pressed ball closure 70 which acts as a check valve to prevent return flow of lubricant from the fitting.

The last measuring device of the series has a suitable outlet fitting 72 threaded in its boss 62. This fitting includes a ball check valve 74 which is held against the end of the outlet passage 64 by a spring 76.

The operation of my improved measuring device is as follows:

A suitable compressor capable of discharging lubricant under high pressure is attached to the fitting 68 and operated to introduce lubricant into the cylinder 18, thereby forcing the projection 52 from its seat and the piston valve 54 downwardly until the lower edge of its skirt portion rests against the gasket 60. During this downward movement the lubricant which is in that portion of the cylinder 18 below the piston valve 54 is forced past the check valve 26 to the bearing, if the bearing is sufficiently loose to permit the lubricant to flow freely. If the bearing is clogged or for any other reason offers a high resistance to flow of the lubricant, the lubricant will be forced past the check valve 26 through the passage 24 to the lower end of the cylinder 20, thus raising the plunger 34 against the pressure of its spring 44. The protrusion of the plunger 34 from the device serves as a visible indicator to the operator that the bearing has not received its measured charge of lubricant, so that the operator may, if this condition persists, and the plunger does not move downward gradually within a prescribed time, strike the protruding end of the plunger 34 with a hammer or similar tool, to exert an explosive pressure upon the lubricant contained in the cylinder 20 and thereby "flush out" the bearing. As the piston valve 54 moves downwardly the measuring device 8 uncovers the outlet port 64 and permits the passage of lubricant to the next device 6 of the series. However, the piston valve 54 of the device 8 is constrained to move to the lower end of its stroke, because the pressure required to unseat the piston valve of the next device 6 of the series is very much greater than that required fully to compress the springs 56 and 44 of the device 8. Thus, the measuring devices will be operated seriatim or successively until the last device of the series has been operated to force its charge of lubricant either to its associated bearing or to its storage chamber. While supplying lubricant under pressure to the system, the operator watches the last measuring device of the series. Extrusion of lubricant from the outlet port 73 of the last device of the series is an indication that all of the devices of the series have been satisfactorily operated.

As stated before, the condition of the bearing is indicated by the extent that the plunger 34 protrudes from its associated measuring device. The operator may observe the extent of the protrusion of the plungers 34 from the devices at intervals and thereby ascertain the condition of each of the bearings, and is immediately apprised of any abnormal condition.

Upon release of the pressure, as by the disconnection of the compressor from the fitting 68, the valves 54 will be forced gradually upwardly until their projections 52 again seat against the openings in their bushings 46. There is sufficient clearance between the piston valves and their respective cylinders (exaggerated in the drawings) so that the lubricant may slowly by-pass the valve during this upward movement.

While I have shown and described a particular embodiment of my invention, I am aware that various modifications may be made without departure from the principles thereof. I therefore desire the scope of my invention to be limited only by the claims which follow.

I claim:

1. In combination, a plurality of bearings to be lubricated, measuring devices connected in series, one associated with each of said bearings, each of said devices being adapted to eject a measured charge of lubricant and thereafter open a port to the next device of the series, a resilient storage chamber communicating at all times with the discharge port of each of said devices and with its associated bearing, and a check valve interposed between the measuring device and the storage chamber to prevent return flow from the storage chamber to the measuring device.

2. A measuring device for use in a central lubricating system comprising, a passage always in communication with a bearing, means for segregating a measured quantity of lubricant and forcing it to said passage, a cylinder having one end freely communicating with said passage, a plunger resiliently held at said end of said cylinder, and having a guiding stem extending through the opposite end of said cylinder, and a check valve for preventing flow of lubricant from said passage to said means.

3. In a lubricating system of the class described, the combination of a device having means for attachment to a bearing to be lubricated, means in said device for ejecting a measured charge of lubricant toward the bearing, reservoir means continuously in communication with said bearing for storing the measured charge under pressure when the resistance to lubricant flow of said bearing is so great as to prevent the admission of the ejected charge, and a check valve to prevent flow of lubricant from said reservoir means to said ejecting means.

4. In a device of the class described, a bearing to be lubricated, a device for forcing a measured charge of lubricant to said bearing, a cylinder continuously in communication with said bearing and adapted to store the measured charge, a plunger reciprocable therein and having a portion extending therefrom, and a check valve interposed between said measuring device and said cylinder to prevent flow of lubricant from said cylinder to said device.

5. In a device of the class described, the combination of means for segregating and ejecting a measured charged of lubricant, an outwardly opening check valve at the outlet of said means, a cylinder communicating with said outlet at a point beyond said check valve, a spring pressed piston in said cylinder, normally held at the lower end of its stroke, a stem rigidly secured to said piston and adapted to limit the reciprocable movement thereof, said stem projecting beyond the end of said cylinder whereby the pressure in said cylinder may be suddenly increased by striking the projecting end of said stem a percussive blow.

6. A measuring device adapted to be attached to a bearing to be lubricated, comprising a valve chamber and a storage chamber, a resilient wall in said storage chamber, a source of lubricant supply connected to said valve chamber, a check valve permitting passage of lubricant from said valve chamber to said storage chamber but preventing flow in the reverse direction, a conduit connecting said storage chamber with the bearing, a valve in said valve chamber adapted to force a predetermined quantity of lubricant past said check valve upon a lubricant pressure impulse from said source of supply, and means for indicating the quantity of lubricant in said storage chamber.

7. In a device of the class described, a bearing to be lubricated, means for forcing a measured charge of lubricant to said bearing, a cylinder continuously in communication with said bearing and adapted to be in communication with said charge-forcing means, a spring pressed plunger reciprocable in said cylinder and having a stem extending from said cylinder, and a check valve interposed between said charge forcing means and said cylinder to prevent flow of lubricant from the latter to the former.

In witness whereof, I hereunto subscribe my name this 4th day of November, 1927.

ERNEST W. DAVIS.